May 6, 1952     H. F. KELLER     2,595,794
INDIVIDUAL AIRPLANE HANGAR
Filed April 4, 1947     2 SHEETS—SHEET 1
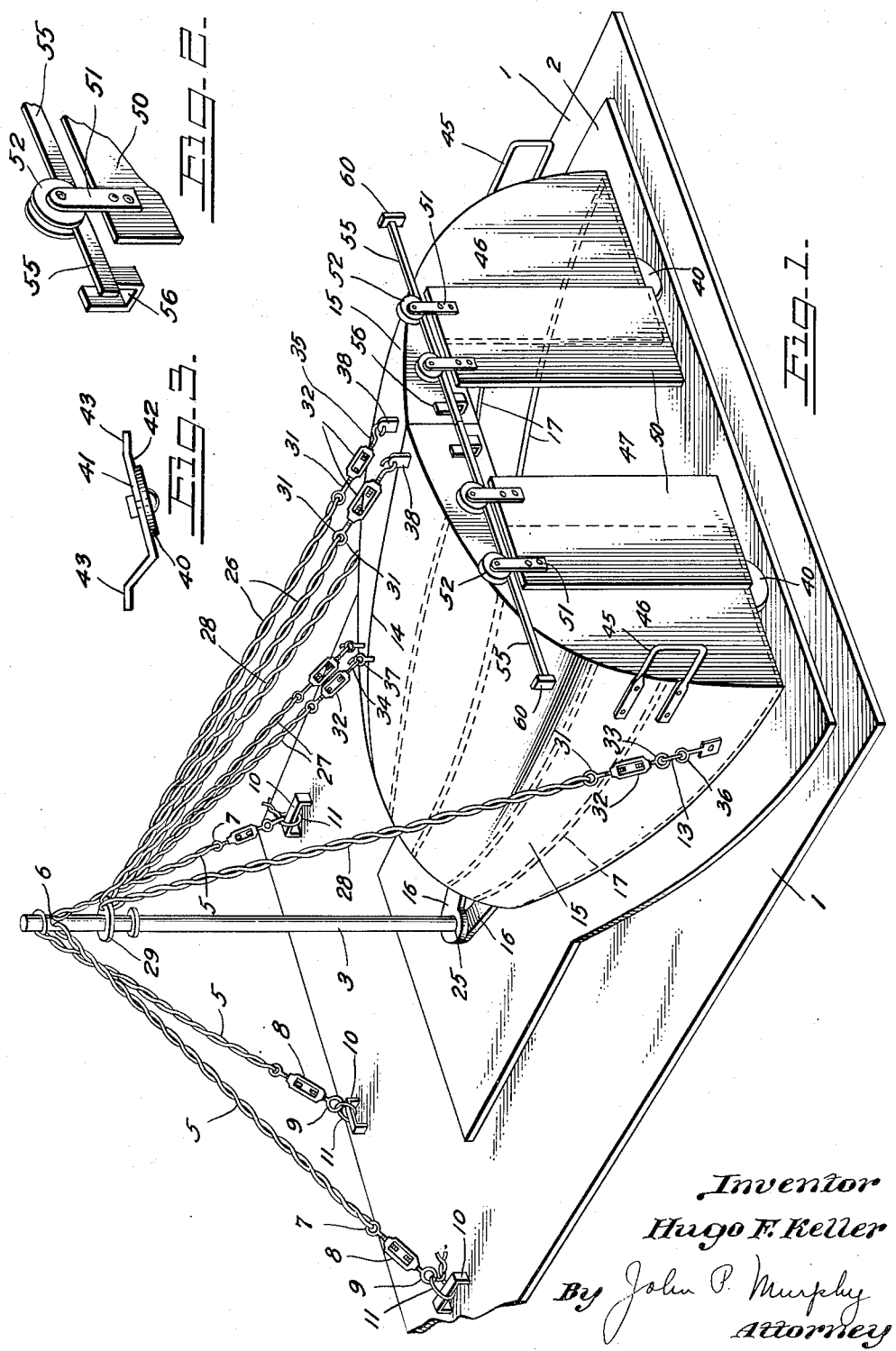
Inventor
Hugo F. Keller
By John P. Murphy
Attorney

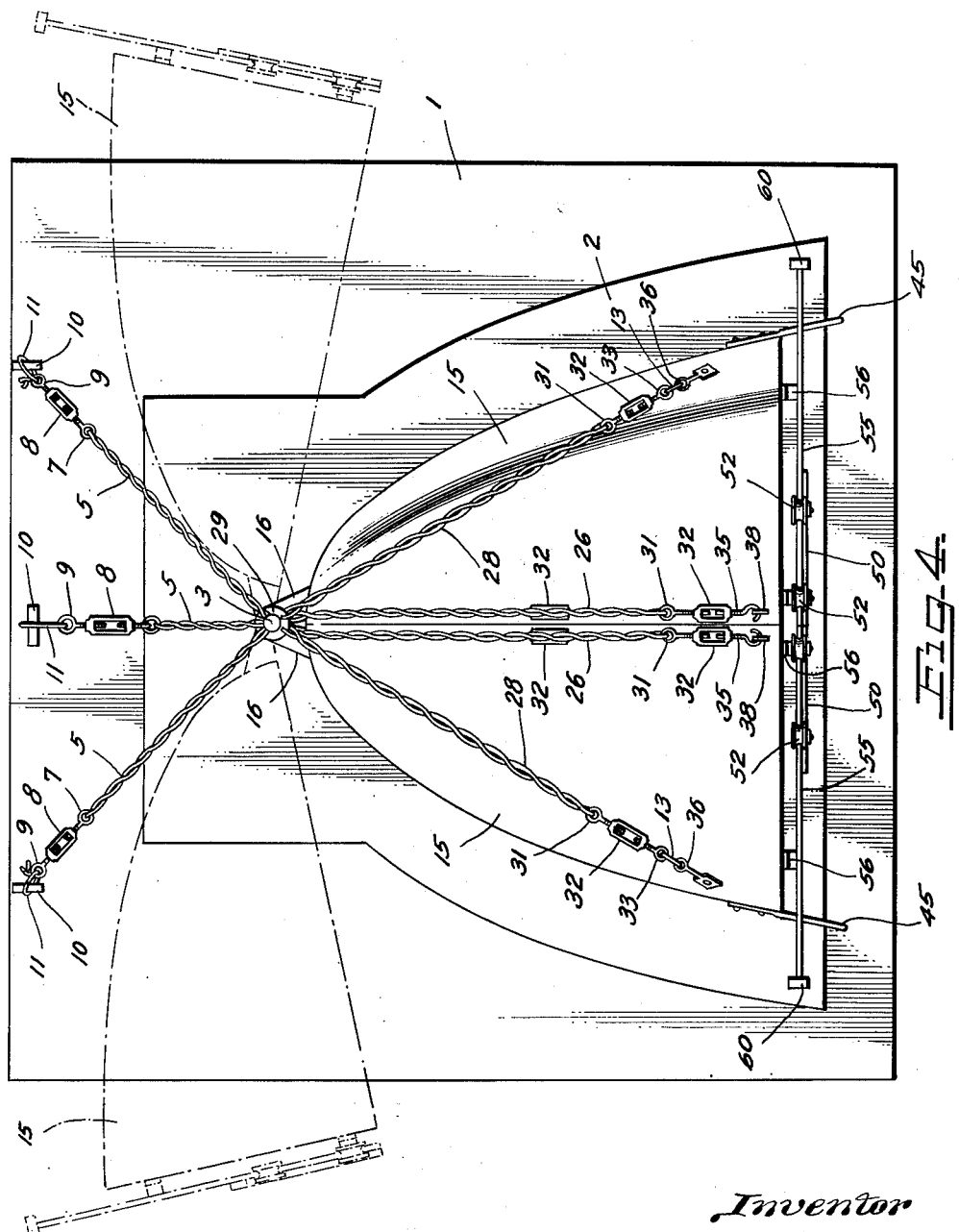

Patented May 6, 1952

2,595,794

UNITED STATES PATENT OFFICE 2,595,794

INDIVIDUAL AIRPLANE HANGAR

Hugo F. Keller, Oneida, N. Y.

Application April 4, 1947, Serial No. 739,287

1 Claim. (Cl. 189—1.5)

My invention relates to an individual airplane hangar and I declare the following to be a full, clear, concise and exact description thereof, sufficient to enable anyone skilled in the art to which it appertains to make and use the same, reference being had to the accompanying drawings in which like parts are represented by like characters throughout the specification.

The object of the invention is to provide a hangar for individual use in housing airplanes. The parts of the hangar are made to open for the admittance of the airplane and then close thereabout after the airplane is moved into position on the base of the hangar.

The object will be understood by referring to the drawings in which

Fig. 1 is a perspective view of the hangar;

Fig. 2 is a detail view of a door used and immediate parts thereof, members being broken away;

Fig. 3 is a detail view of a wheel and immediate parts, showing a plan thereof;

Fig. 4 is a plan view of the hangar.

Referring more particularly to the drawings, the hangar embodies a platform 1 upon which rests an asbestos matting 2. The platform 1 and matting 2 provide a base for the airplane hangar. Matting 2 is made to conform to the conchal shape of the lower edge of the hangar. An upstanding pole 3 is anchored in an aperture formed in matting 2 and platform 1. It is supported in upright position by guy wires 5, 5, 5, that are disposed through an aperture 6 in the top part of pole 3 and in one instance wound thereabout. Wires 5 are doubled and twisted. The free ends are connected to eyebolts 7 of turnbuckles 8 which allow for adjustment. Bolts 9 of turnbuckles 8 are connected to anchors 10 by wires 11. Anchors 10 are secured to platform 1.

The cover members for enclosing the airplane comprise two similarly shaped complementary parts 15, 15 that are swung into position and meet at the center thereof to provide a housing for the airplane. Each of the parts 15 is conchal in form and is mounted to swing upon pole 3 as a pivot. For this purpose a horizontal extension 16 is welded or otherwise attached to the lower rear edge of each of the members 15, 15. Extensions 16, 16 overlap in assembled position where pole 3 projects therethrough. Parts 15 are made by forming a framework of braces 17 which are welded together at their respective ends. Braces 17 are covered by sheet metal 18 as aluminum or other suitable material.

Apertures 25 are made in extensions 16, 16 for the projection of pole 3 which acts as a fulcrum for parts 15, 15 to swing upon. Each of the parts 15 is held in suspended position off matting 2 and platform 1 by guy wires 26, 27, 28 which at one end pass through an aperture in leaf 29 formed on a collar 30 rigidly fixed adjacent the top part of pole 3. Said wires 26, 27, 28 are doubled and twisted. Their free ends are connected to eye bolts 31 of turnbuckles 32 which allow for adjustment. Eye bolts 33 of turnbuckles 32 are connected to eye bolts 36 fastened to parts 15, 15 by wires 13. Eyebolts 34 and 35 are connected to eyebolts 37 and 38 fastened to parts 15. One of said eye bolts 36 is located adjacent the lower front edge of the swinging member 15, bolt 37 is located adjacent the front central part and bolt 38 about half way between the front and rear parts along the ridge 14 of parts 15, 15.

The means for aiding in swinging members 15, 15 from full to dotted line position illustrated in Fig. 4, whereby to admit the airplane, embodies in each instance a wheel 40 which is mounted to turn on an axle 41 fastened to a leaf member 42 that has a bend therein with its ends 43, 43 formed at an angle. The ends 43, 43 are welded or otherwise secured to the inside surface of the casing of part 15.

A handle member 45 is attached to the front side of each of the members 15, 15, whereby to also aid in swinging said members 15, 15 on their common fulcrum or pole 3.

The front wall 46, 46 of each of the members 15, 15 is provided with a partial door opening 47. When members 15, 15 are brought together as shown in full lines in Fig. 4, the opening 47 forms an entrance to the hangar.

Said entrance 47 is closed by two similarly shaped sliding hanging doors 50, 50. Hangars 51, 51 having grooved pulleys 52, 52 are attached to each of the doors 50, 50. Said pulleys 52, 52 are mounted to travel on rails 55, 55 supported by channel shaped brackets 56, 56 attached to the upper part of the front walls 46, 46 of each of the members 15, 15.

In operation when it is desired to house an airplane in the hangar, the user grabs handles 45, 45 and moves members 15, 15 from full to dotted line position illustrated in Fig. 4 and then moves the airplane onto matting 2 and platform 1. He thereafter swings members 15, 15 back into full line position illustrated in Fig. 4. Doors 50, 50 can be moved to closed position by pushing them towards each other. Stops 60 are fastened to rails 55, 55, whereby to prevent doors 50, 50 from moving thereoff.

Having thus described my invention, what I claim is new and desire to secure by Letters Patent is a follows:

In an individual airplane hangar, a platform, a pole standing upright on said platform, guy wires attached to said pole and supporting the same, shell-shaped complimentary enclosing members pivoted to swing on said pole as a fulcrum said shell-shaped complementary enclosing members of approximately the size of said platform, each of said shell-shaped members comprising a frame work of braces covered by a suitable material, overlapping extensions attached to each of said shell-shaped members and pivoted to said pole, whereby to allow said shell members to swing from said pole as a fulcrum, wires connecting said pole with said shell members for holding the same in suspended position when off said platform, said shell members, when located on the platform, being supported by the pivotal engagement of said extensions with the pole at the rear and by wheels at the front, a door opening formed in said shell members, and rails mounted on said shell members, rollers mounted to travel on said rails, hangars attached to said rollers and said doors attached to said hangars, whereby said doors can move relative to each other to close said opening.

HUGO F. KELLER.

REFERENCES CITED

The following references are of record in the file of this patent:

UNITED STATES PATENTS

| Number | Name | Date |
| --- | --- | --- |
| 716,447 | Lynch | Dec. 23, 1902 |
| 1,109,648 | Kauertz | Sept. 1, 1914 |
| 1,169,143 | Furlong | Jan. 25, 1916 |
| 1,443,446 | Watermann | Jan. 30, 1923 |
| 2,274,848 | Pennell | Mar. 3, 1942 |

FOREIGN PATENTS

| Number | Country | Date |
| --- | --- | --- |
| 122,846 | Great Britain | Jan. 25, 1919 |
| 283,651 | Germany | 1915 |
| 864,437 | France | 1941 |